Jan. 26, 1971  P. H. LEGARRA  3,557,550
PRESSURE-CONTROLLED BOMB EJECTOR FOR AIRCRAFT
Original Filed Feb. 7, 1966  3 Sheets-Sheet 1

INVENTOR.
PHILIP H. LEGARRA
BY Zulweiler, Patton, Rieber
Lee, and Utecht
ATTORNEYS Jan. 26, 1971  P. H. LEGARRA  3,557,550
PRESSURE-CONTROLLED BOMB EJECTOR FOR AIRCRAFT
Original Filed Feb. 7, 1966  3 Sheets-Sheet 2
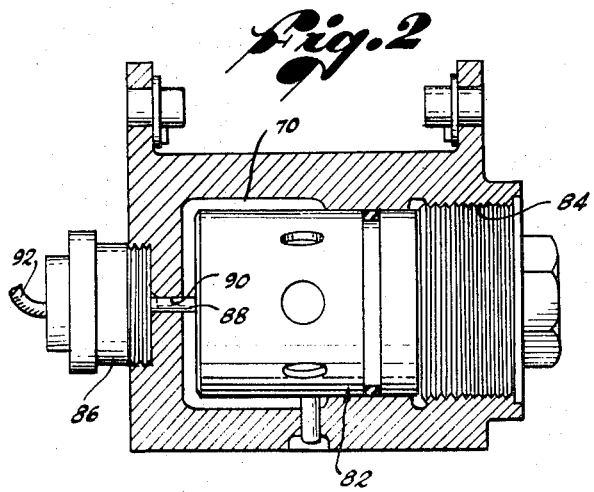
Fig. 2
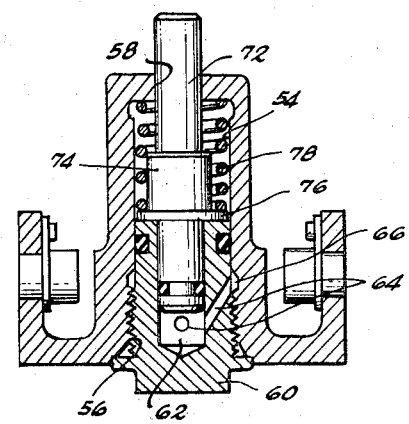
Fig. 3
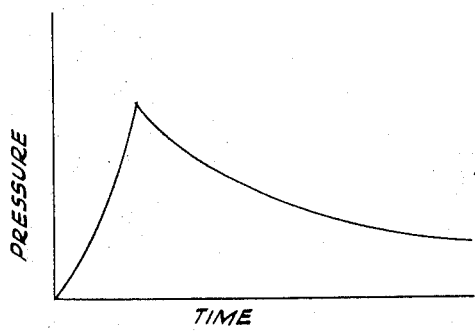 
Fig. 4
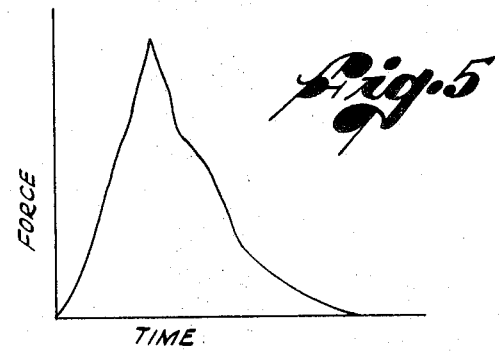
Fig. 5
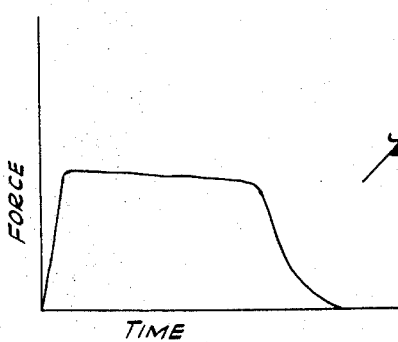
Fig. 6
INVENTOR.
PHILIP H. LEGARRA
BY Fulwider, Patton, Rieber
Lee, and Utecht
ATTORNEYS

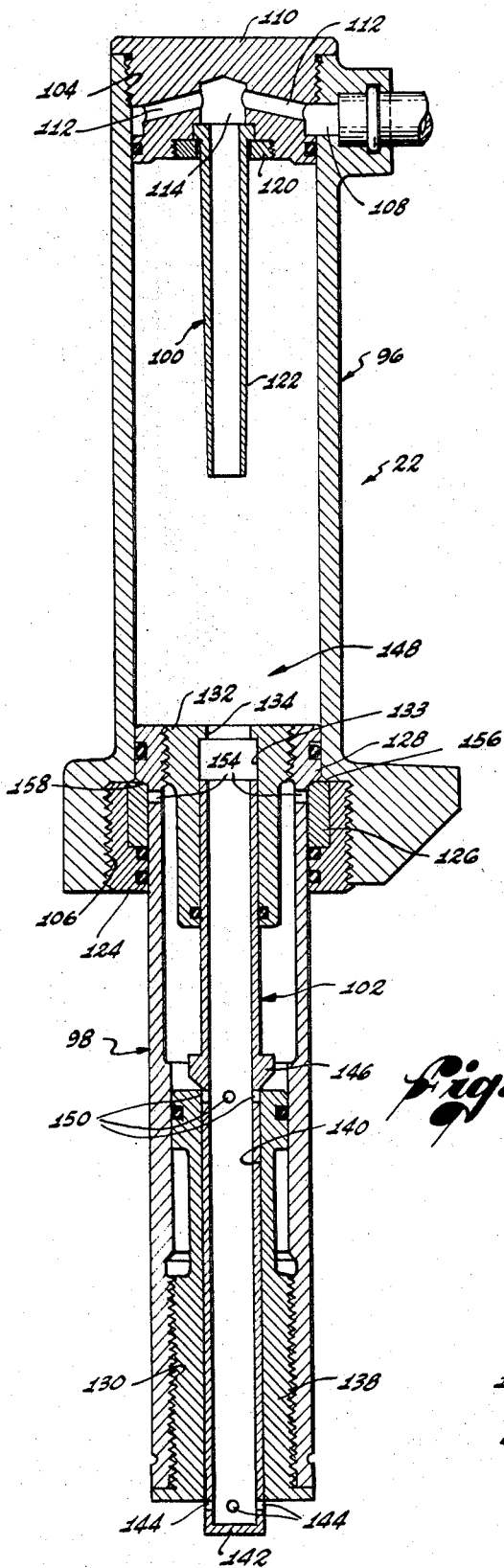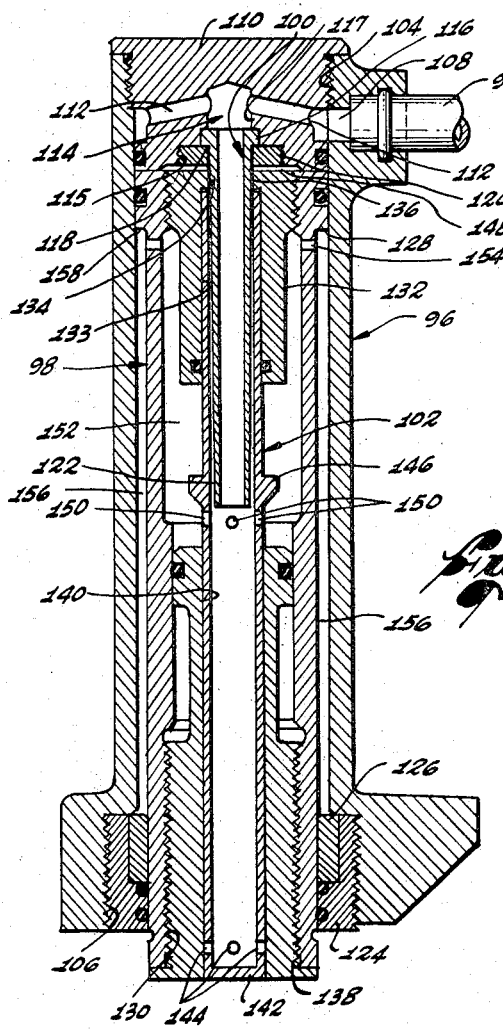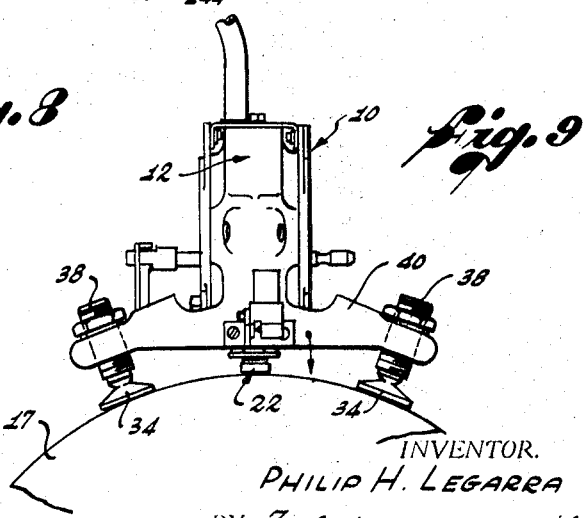

United States Patent Office 3,557,550
Patented Jan. 26, 1971

3,557,550
PRESSURE-CONTROLLED BOMB EJECTOR
FOR AIRCRAFT
Philip H. Legarra, Long Beach, Calif., assignor, by mesne assignments, to Whittaker Corporation, Los Angeles, Calif., a corporation of California
Continuation of application Ser. No. 525,485, Feb. 7, 1966. This application Feb. 5, 1968, Ser. No. 707,010
Int. Cl. F01b 29/08; F15b 15/22, 15/17
U.S. Cl. 60—26.1                        18 Claims

ABSTRACT OF THE DISCLOSURE

A pressure controlled bomb ejector in which a varying pressure fluid supply derived from an explosive charge is controlled to produce a substantially constant pressure and resulting force on a bomb ejecting piston. A variable orifice is provided between the varying pressure supply and the piston chamber. The pressure-reducing effect of the orifice varies with extension of the piston over a substantial portion of the movement of the latter in accordance with the pressure-time characteristic of the varying supply in order to provide the substantially constant pressure in the piston chamber. A retracting mechanism that makes use of the pressurized fluid supplied by the charge is also provided to automatically retract the piston after its full extension in ejecting a bomb.

---

This application is a continuation of copending application Ser. No. 525,485, filed on Feb. 7, 1966, and entitled "Pressure-Controlled Bomb Ejector for Aircraft."

The present invention relates to improvements in ejector mechanisms and, more particularly, to an improved pressure-controlled drive mechanism ideally suited to use as an ejector for bombs from high speed aircraft.

It is common in present day warfare for high speed aircraft, such as jet fighter planes, to carry one or more bombs in addition to other armament. Generally, the bombs are carried under the wings of the aircraft and are each held in place by a bomb rack connected to the underside of the wings. To support a bomb, each rack includes a pair of hooks passing through small loops extending from the top of the bomb. The hooks are movable and are under the control of a linkage mechanism. Therefore, to fire a bomb, the linkage mechanism is energized and rapidly retracts the hooks to release the bomb from the aircraft.

At the time of the bomb's release, it is traveling at the same velocity of the aircraft. For high speed aircraft, this means that unless some compensating steps are taken, the bomb will initially travel under the aircraft in a trajectory which is likely to result in the bomb striking the tail of the aircraft's fuselage.

To counteract this possiblity, the pilot, of course can slow the aircraft during bombing to allow the bomb sufficient time to drop before passage of the tail of the fuselage over the bomb or the pilot can rapidly alter the flight path of the aircraft after release of the bomb. These steps are not particularly desirable solutions and in fact may be exceedingly dangerous courses to follow during a bombing attack, particularly when under enemy fire.

Therefore, in an attempt to insure that each bomb will clear the aircraft, bomb racks generally include one or more fluid pressure-controlled bomb ejector mechanisms. Generally speaking, each bomb ejector mechanism operates upon release of the hooks of the associated rack to literally throw the bomb downward from the aircraft. To accomplish this, each bomb ejector mechanism includes a piston which pushes the bomb from its rack upon the application of a high pressure fluid charge to the upper end of the piston.

Theoretically, such an ejector mechanism represents an ideal solution to the problems created by the natural trajectory of a bomb released from a high speed aircraft. Unfortunately, however, the aircraft structure and the pressure characteristics of the fluid charge present serious practical problems which commonly lead to dangerously unpredictable and erratic operation of conventional bomb ejector mechanisms.

First of all, the force of the high pressure fluid charge acting on the piston to hurl a bomb from an aircraft produces a like reaction force on the aircraft. By the very nature of the aircraft construction, there is a maximum reaction force which the aircraft structure can tolerate without being permanently damaged or weakened. This means that extreme care must be exercised in the design of the ejector mechanism and in the selection of the high pressure fluid charge to insure that the maximum reaction force is not exceeded.

Secondly, the pressure of the fluid charges commonly employed in bomb ejector mechanisms rises rapidly to a maximum value and then immediately, and nearly as rapidly, decreases to a minimum value.

In present day bomb ejectors, the fluid charge is applied to the piston through a small metering orifice to control the force on the piston and hence the reaction force to the safe maximum for the aircraft structure. The force on the piston, however, possesses the same type of characteristic as the pressure of the fluid charge, rising immediately to a maximum and then decreasing just as rapidly back to a minimum. This means that the maximum allowable force is applied only momentarily to the bomb and that the downward velocity of the bomb upon release from the rack is only a fraction of that of the theoretical maximum which could be attained if the maximum force were applied to the piston throughout its entire stroke. In fact, in some instances, and particularly in cases of heavy bombs, the downward bomb velocity attainable with conventional ejector mechanisms is less than that required to insure that the bomb will clear the aircraft.

Additional problems and limitations are presented to conventional ejector mechanisms by the construction of the cartridges utilized to contain and develop the fluid charges. In particular, the cartridge is generally formed of plastic and lightweight metals and includes a primer which is electrically excited to fire the cartridge and create the high pressure fluid charge. Small fragments of the metal and plastic flow with the charge and tend to rapidly clog the small metering orifice. Therefore, after each bombing run, the ejector mechanism must be partially dismantled and the metering orifice thoroughly cleaned. Otherwise, the clogged orifice will cause unpredictable driving forces to be developed on the piston and result in correspondingly erratic downward bomb velocities from one bomb run to the next. Unfortunately, the removal, cleaning and replacement of the metering orifice required in conventional bomb ejector mechanisms is laborious, time consuming and materially increases the time required to reload bomb racks and ready fighter planes for their next mission.

The use of the small metering orifice also places a severe strain upon the materials forming the orifice as well as the other tubular members connected thereto. In particular, the high pressure fluid acting on the small orifice and the jet stream of fluid formed thereby rapidly erodes and enlarges the orifice and strains the surrounding tubing. This means that the metering orifice must be periodically replaced and that heavy, expensive tubing must be employed if the piston and reaction forces produced by the fluid charge are to be maintained somewhat uniform and within a maximum reaction force of the associated aircraft.

In view of the foregoing, as well as other shortcomings of present day aircraft bomb ejector mechanisms, it is an object of the present invention to provide an improved, fluid controlled ejector mechanism which will act upon a varying pressure fluid charge and produce a substantially constant force on a drive piston over a predetermined length of time whereby bombs fired by the ejector mechanism will possess a terminal velocity approximating the maximum theoretical value for a given maximum allowable reaction force.

Another object of the present invention is to provide an ejector mechanism of the foregoing character which is simple in design and reliable in operation.

A still further object of the present invention is to provide an ejector mechanism of the foregoing character which is extremely long lasting and which requires little if any servicing over periods of extended use.

Still another object of the present invention is to provide an ejector mechanism of the foregoing character in which minimum forces are developed on the tubing transporting the high pressure fluid to the drive piston, thereby allowing the use of relatively lightweight, inexpensive materials.

A still further object of the present invention is to provide an ejector mechanism having the foregoing characteristics which may be used in many different devices, such as catapults, seat ejectors, and rocket firing mechanisms.

Still another and more general object of the present invention is to provide a fluid pressure controllable drive mechanism which is capable of acting upon a varying pressure fluid charge and which will produce a drive force on a movable drive member which is a predetermined function of the movement of the drive member.

The foregoing as well as other objects and advantages of the present invention may be more clearly understood by reference to the following detailed description, when taken with the drawings, which, by way of example only, illustrates one form of ejector mechanism embodying the features of the present invention.

In the drawings:

FIG. 2 is a sectional view taken along the line 2—2 in FIG. 1, illustrating the position of the cartridge in the bomb rack together with the means for electrically exciting the cartridge to produce a high pressure fluid charge for use in the ejector mechanism;

FIG. 3 is a sectional view taken along the line 3—3 in FIG. 1, illustrating a slave piston construction for controlling the linkage to retract the bomb holding hooks of the rack;

FIG. 4 is a graph representing the typical pressure characteristic of a high pressure fluid charge contained in a cartridge of the type employed in bomb racks;

FIG. 5 is a graph illustrating the piston and reaction force characteristics produced in conventional ejector mechanisms utilizing a small fixed metering orifice;

FIG. 6 is a graph illustrating the piston and reaction force characteristics produced by ejector mechanisms constructed in accordance with the present invention;

FIG. 7 is a cross-sectional view of a portion of the ejector mechanism of the present invention including a piston which is shown in a retracted position;

FIG. 8 is a sectional view similar to FIG. 7 with the piston in an extended position; and FIG. 9 is an end view of the bomb rack of FIG. 1 shown supporting a bomb.

Figure 1:
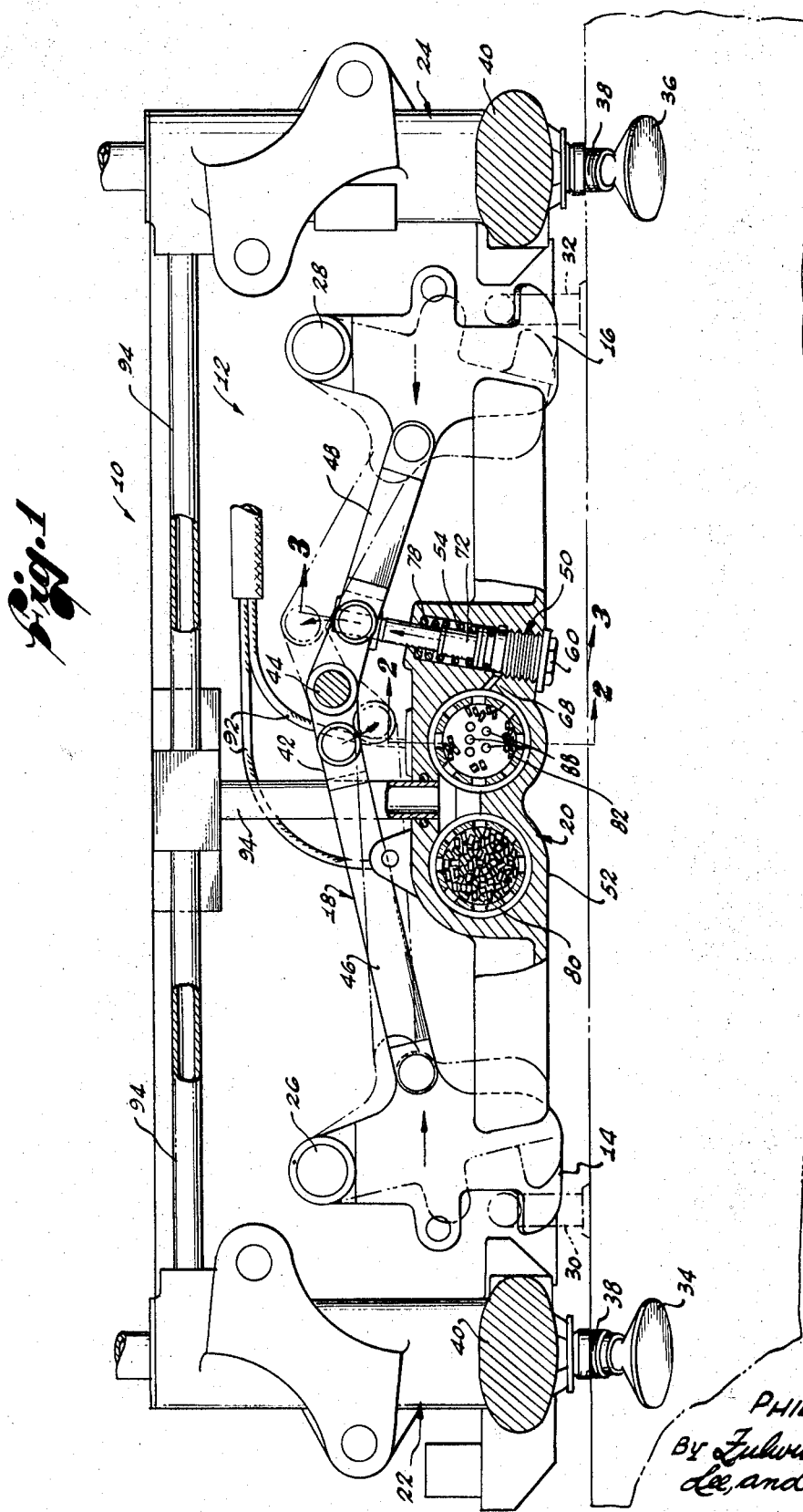
FIG. 1 is a partially sectioned side view of a bomb rack employing the ejector mechanism of the present invention.

In outward appearance, the bomb rack 10 of FIG. 1 is nearly identical to conventional bomb racks now in use by the military for carrying bombs under the wings and fuselage of high speed fighter planes. Generally speaking, the bomb rack is designed for connection to the bottom of a brace (not shown) extending from the wing or fuselage of an aircraft and includes a frame 12 supporting fore and aft hooks 14 and 16 for carrying a bomb 17. The hooks 14 and 16 are controlled by a linkage mechanism 18 which, in turn, operates in response to a high pressure gas generator 20 to retract the hooks and allow the bomb to drop free of the rack 10. The operation of the gas generator 20 also energizes fore and aft drive piston assemblies 22 and 24 to push the bomb from the rack as it is released by the hooks.

In the illustrated form of the invention, the drive piston assemblies 22 and 24 develop substantially uniform forces on the bomb over their entire stroke to impart a maximum downward velocity to the bomb for a given maximum force. This the present invention accomplishes without exceeding the maximum reaction force which the aircraft structure can tolerate, and does so in a reliable, highly efficient manner which eliminates the need for cleaning of the drive piston assemblies and associated tubing from the gas generator 20.

More particularly, in order for the hooks 14 and 16 to carry the bomb 17 and to subsequently retract under operation of the linkage mechanism 18, the hooks are connected by pivot pins 26 and 28 to the frame 12 for swinging movement fore and aft. In swinging fore and aft, the hooks 14 and 16 engage and pass through small loops 30 and 32, respectively, extending from the top of the bomb 17. Thus positioned, the hooks secure the bomb against undesired fore and aft movement while pairs of fore and aft, generally cup-shaped support feet 34 and 36 engage the top of the bomb on opposite sides of the loops to prevent undesired transverse movement of the bomb while being carried by the rack 10.

The arrangement of the support feet is most clearly illustrated in FIG. 9. As represented, the feet are connected to the bottom of adjustment screws 38 passing through right and left end portions of cross arms 40 extending transversely from fore and aft portions of the frame 12.

As previously indicated, the movement of the hooks 14 and 16 is controlled by the linkage mechanism 18 which in the illustrated form includes a bellcrank 42 pivotally connected by a pin 44 to the frame 12, a relatively long rod 46, and relatively short link 48. The rods 46 and 48 are pivotally connected to the opposite ends of the bellcrank 42 and to the fore and aft hooks 14 and 16, respectively.

To cause the linkage mechanism 18 to retract the hooks 14 and 16 (in the manner illustrated in FIG. 1), the frame 12 houses a slave piston assembly 50 adjacent a breechblock 52 supporting the gas generator 20. As illustrated most clearly in FIG. 3, the slave piston assembly 50 includes a vertically extending cylinder 54 having an internally threaded lower end 56 open to the bottom of the rack 10, and a hole 58 in its upper end facing the bellcrank 42. The lower end 56 is adapted to receive a threaded plug 60 having an axial bore 62 and a plurality of inclined side parts 64. The side ports 64 extend from the axial bore 62 to an annular recess 66 in the inner wall of the cylinder 54 which, in turn, communicates with a side port 68 to the breech chamber 70 containing the gas generator 20.

Within the cylinder 54, the axial bore 62 is adapted to receive the lower end of a piston rod 72, the upper end of which extends through the hole 58 in the top of the cylinder 54 to contact the junction of the bellcrank 42 and the short rod 48 of the linkage mechanism 18. The piston 72 carries a sleeve 74 and a collar 76, and is encircled by a coil spring 78. The coil spring 78 is captured in the upper end of the cylinder 54 and presses against the top of the cylinder and downward on the collar 76 to normally force the collar against the upper end of the plug 60.

In operation, when it is desired to release the bomb 17 from the rack 10, the high pressure gas generator 20 is excited and high pressure gas transmitted through the side port 68 into the annular recess 66 in the cylinder 54. From the recess, the high pressure gas passes rapidly through the inclined side ports 64 to the lower end of the axial bore 62 within the plug. Within the plug 60, the gas exerts a high pressure on the lower end of the piston 72 causing the piston to move rapidly upward within the cylinder 54 away from the plug and against the force of the spring 78. As the piston 72 moves upward, the upper end thereof causes the bellcrank 42 to rotate in a counterclockwise direction as illustrated in FIG. 1. As the bellcrank rotates, it retracts the hooks 14 and 16 allowing the bomb 17 to drop from the rack 10. At the termination of the high pressure surge from the gas generator 20, the piston 72 retracts under the force of the spring 78.

To generate the high pressure gas charge necessary to operate the slave piston assembly 50 and, as will be hereinafter described, to also operate the drive piston assemblies 22 and 24, the gas generator 20 includes a pair of cartridges 80 and 82. (See FIGS. 1 and 2). The cartridges are of conventional design being formed of plastic and lightweight metals and being adapted to screw into threaded holes 84 in the front of the breechblock 52 leading to the breech chamber 70. In addition, the cartridges each include a primer and a quantity of explosive powder which upon igniting cause the innermost end of the cartridge to literally explode, producing a high pressure gas charge for application to the slave piston assembly 50 as well as to the drive piston assemblies 22 and 24.

To fire the cartridges 80 and 82, the rack 10 includes a pair of terminal plugs 86 screwed to the back of the frame 12 with a plurality of metal pins 88 passing therefrom through holes 90 in the frame into the breech chamber 70 and the innermost end portions of the cartridges. Electrical cables 92 connected to the terminal plugs 86 carry electrical energy from a source (not shown) to the pins 88 to develop high voltages which ignite the primer and hence cause the cartridges to explode producing high pressure gas charges in the chamber 70.

The pressure characteristic of the gas charge developed by the generator 20 is graphically illustrated in FIG. 4. As represented, on the firing of the cartridges 80 and 82, a gas charge is produced in which the pressure rises rapidly to a maximum value and then decreases from the maximum towards a minimum value. As previously discussed, when such a high pressure gas charge is applied to the piston assembly of conventional bomb ejector mechanisms through a small, fixed size, metering orifice, the piston force and the reaction forces developed thereby have a characteristic similar to that illustrated by the graph of FIG. 5. That is, the force on the piston increases rapidly to a maximum value and then reduces at nearly the same rate to a minimum value. When the small metering orifice is clear of debris or not enlarged by erosion, it insures that the reaction force developed on the aircraft does not exceed the maximum which the aircraft structure can tolerate. However, as indicated by the graph of FIG. 5, the use of the fixed metering orifice with the conventional gas generator allows the maximum force to be applied only momentarily to the piston. This means that the terminal velocity of the piston and hence the downward velocity imparted to the associated bomb are far less than the theoretical maximums attainable if the maximum force were applied to the piston throughout its entire stroke.

In the illustrated form of the invention, the varying pressure gas charge produced by the cartridges 80 and 82 is applied to the piston drive assemblies 22 and 24 and develops thereon substantially constant forces over the entire stroke of the pistons. The piston and reaction force characterisitc associated with the preesnt invention is illustrated by the graph in FIG. 6. As represented, in response to the high pressure gas charge having the characteristic of FIG. 4, the piston force, and hence the reaction force developed thereby, increase rapidly to a maximum value and then remain substantially constant to the end of the piston stroke at which time the force on the piston rapidly reduces to a minimum value. With such an arrangeemnt, the downward velocity of the bomb is substantially the theoretical maximum which can be attained for a given maximum reaction force and insures that the bomb will clear the aircraft even at high speeds.

In the bomb rack 10, the high pressure gas charge developed in the breech chamber 70 by the generator 20 is applied through a T-shaped tube 94 to the fore and aft drive piston assemblies 22 and 24. The structure and operation of the drive piston assemblies are the same for each. Therefore, only the assembly 22 is illustrated in the drawings and described in detail herein.

Generally speaking, and as illustrated in FIGS. 7 and 8, the drive piston assembly 22 includes a cylinder 96, a piston 98, a stationary tube 100, and a movable tube 102.

More particularly, the cylinder 96 includes an internally threaded open top 104 and bottom 106 and a side port 108 for receiving an end of the T-shaped tube 94 from the gas generator 20.

The top 104 of the cylinder is sealed by an externally threaded cap 110 which includes a plurality of equally spaced, radially extending side ports 112 leading from the side port 108 to an axial bottom hole 114 in the cap. The bottom hole 114 is inwardly stepped and includes a relatively large internally threaded bottom portion 115, an intermediate portion 116, and a relatively small top portion 117 leading to the side ports 112. The intermediate portion 116 acts as a seat for the enlarged annular top 118 of the stationary tube 100 which is held in place by a retaining ring 120 screwed into the bottom portion of the hole 114. Thus supported, the stationary tube 100 extends axially into the cylinder 96 and as illustrated includes a downwardly and inwardly tapered outer surface 122 of reducing radial dimension.

The lower end of the cylinder 96 remains open although an externally threaded sleeve 124 carrying a bushing 126 is screwed into the open bottom to guide the lower portion of the piston 98 during its travel into and out of the cylinder.

As indicated, the piston 98 is adapted for axial sliding movement within the cylinder 96 between retracted (FIG. 7) and extended (FIG. 8) positions, and takes the form of a hollow cylinder having an enlarged top portion 128 in sliding contact with the inner wall of the cylinder, and an internally threaded bottom portion 130. A relatively short, generally cylindrical plug 132 is screwed into the open top of the piston 98 and incudes an axial hole 133 for loosely receiving the stationary tube 100. In this regard, however, the topmost portion of the axial hole 132 is of reduced radial dimension to define an annular shoulder 134 around the stationary tube 100 which, together with the stationary tube, defines an annular orifice 136, the nature and operation of which will be described hereinafter.

The bottom of the piston 98 is blocked by an externally threaded, tubular, valve tube guide member 138, and the movable valve tube 102 having a closed lower end. The valve tube guide member 138 screws tightly into the threaded open bottom 130 of the piston with the outer wall of the member pressing tightly against the inner wall of the piston to prevent fluid from leaking therearound to atmosphere. In addition, the axial hole 140 in the valve tube guide member 138 is coaxial with the axial hole 133 in the plug 132, both holes being adapted to receive and guide the movable valve tube 102.

The movable valve tube 102 is a hollow cylinder having an open top end for receiving the stationary tube 100 and a closed bottom 142 with a plurality of side ports 144 normally blocked by the guide member 138. The valve tube 102 fits within the axial bores 140 and 133 in the guide member and plug and is adapted to move with the piston 98 from its retracted to extended positions upon a firing of the cartridges 80 and 82, and, thereafter to continue to move axially to a position defined by a shoulder 146 extending from the valve tube contacting the top of the guide member 138. In the latter position, the side ports 144 are exposed and any residual gas in the breech chamber 70 and debris and carbon from the cartridge firing are dumped to atmosphere.

In particular, with the drive piston assembly 22 in the retracted position illustrated in FIG. 7, when the cartridges 80 and 82 are fired, the high pressure fluid charge surges down the T-shaped tube 94 and into the cap 110 through the plurality of radial side ports 112. The high pressure gas then flows rapidly down the stationary tube 100 and into the bottom of the movable valve tube 102. The side ports 144 in the valve tube 102 are normally blocked by the valve guide member 138, hence, the high pressure gases immediately exert a downward force on the bottom of the valve tube tending to move the valve tube in a downward direction against the bomb 17.

The high pressure gases also immediately flow upwardly around the outside of the tapered stationary tube 100 and through the orifice 136 defined by the annular shoulder 134 and the stationary tube into the cylinder head 148 immediately below the cap 110. In traveling through the orifice 136, which in the retracted piston position is relatively small, the gases suffer a relatively large energy and pressure loss and develop a predetermined downward pressure of reduced value on the top of the piston 98 causing the piston to begin to push the bomb 17 downward from the rack 10.

As the piston 98 begins to move downward with the bomb 17, the size of the orifice 136 begins to increase due to the inward taper of the stationary tube 100, meaning that the high pressure gases then suffer less of an energy and pressure loss in passing through the orifice into the cylinder head 148. This enables the gases to maintain a substantially constant pressure within the cylinder head and to develop a substantially constant downward force on the top of the piston 98 despite the decrease in the pressure of the gas charge and the increasing volume of the cylinder head.

As the piston 98 continues its travel toward the extended position illustrated in FIG. 8, the size of the orifice 136 continues to increase in a manner such that the pressure in the cylinder head 148 remains substantially constant to produce a constant downward force on the top of the piston throughout its entire stroke.

By proper selection of the cartridges 80 and 82 and by the suitable tapering of the stationary tube 100, the constant downward force on the piston 98 is designed to closely approximate the maximum reaction force which the associated aircraft structure can tolerate. Thus, the maximum force is continuously applied to the piston during its entire stroke from retracted to extended positions. This means that when the bomb 17 is released from the end of the piston 98, it has acquired its maximum downward velocity for the maximum allowable reaction force.

After the release of the bomb 17 from the end of the piston 98, the movable valve tube 102 continues its travel in a downward direction until the shoulder 146 engages the top of the guide member 138. In this position, the side ports 144 from the bottom of the valve tube are exposed to atmosphere. This provides an escape path for any residual gas from the gas generator 20 to atmosphere and also provides a means for dumping any debris from the cartridges 80 and 82 out of the piston assembly 22.

In particular, in the drive piston assembly 22, the port sizes are large enough not to be clogged by bits of metal and plastic blown with the gas charge from the cartridges 80 and 82. The debris therefore flows with the high pressure gas charge down the stationary tube 100. Most of the debris is carbonized by the heat generated upon the explosion of the cartridges and converted carbon particles which flow downward into the bottom of the valve tube 102. The particles generally remain in the bottom of the valve tube 102 and do not flow up with the gas charge around the stationary tube 100. However, even if some debris and particles do travel up around the stationary tube 100, they are wiped from the tube's exterior and fall to the bottom of the valve tube 102 upon downward movement of the piston 98. Hence, the bottom of the valve tube 102 acts as a trap for debris from the cartridges which is dumped to atmosphere through the ports 144 upon the extension of the valve tube beyond the end of the piston 98 and after the ejection of the bomb 17 from the rack 10.

In practice, the self-cleaning nature of the piston assembly 22 eliminates the need to clean the ejection mechanism after each bombing run and allows the associated bomb rack to be reloaded in a minimum length of time. This is in direct contrast to conventional ejector mechanisms which require cleaning after each use to insure safe operation.

As illustrated in FIG. 8, in the extended position, the end of the piston 98 lies well beyond the open end of the cylinder 96 and the enlarged top portion 128 is immediately adjacent the bushing 126 carried by the piston guide member 124. In this position, large air drag forces are developed on the piston which not only tend to slow the aircraft but also exert undesired transverse forces on the cylinder wall and upper portion of the piston. In order to minimize such drag forces and eliminate unnecessary wearing of the piston 98, the piston drive assembly 22 includes means for automatically returning the piston to its retracted position after the firing of the bomb 17 from the rack 10. Such means includes a plurality of side ports 150 from a mid-portion of the valve tube 102 immediately below the shoulder 146. The side ports 150 lead to a hollow 152 within the piston 98 between the upper end of the guide member 138 and the inner surfaces of the plug 132. Also, the outer walls of the piston 98 immediately adjacent the enlarged upper end 128 include a plurality of side ports 154 leading to an annular chamber 156 within the cylinder 22 between the bushing 126 and the enlarged upper end 128 of the piston.

In operation, a portion of the high pressure gases from the generator 20 initially passing through the stationary tube 100 also pass through the side ports 150 and into the hollow 152 and annular chamber 156. In practice, it has been found that the hollow 152 and annular chamber 156 effectively absorb the inital maximum pressure gases from the generator 20 further improving the constancy of the pressure developed in the cylinder head 148 and of the downward forces acting on the top of the piston 98. In addition, the annular chamber acts as an accumulator for high pressure gases to develop upward forces sufficient to return the piston 98 to its original retracted position at the end of the piston stroke.

In particular, as the piston 98 travels downward within the cylinder 96 to eject the bomb 17, the gases in the annular chamber 156 are compressed by the lower annular surface 158 of the enlarged top portion 128 of the piston and forced back toward the valve tube 102. Simultaneously, upward forces are developed on the lower surface 158 which oppose the downward forces acting on the top of the piston 98. The upward forces are insufficient to noticeably slow the downward motion of the piston. However, at the end of the piston stroke, the movement of the valve tube 102 beyond the end of the piston 98 blocks the return ports 150 from the outer annular chamber 156 to the valve tube. At the same time, the inside of the cylinder 96 is exposed to atmospheric pressure through the side ports 144 in the bottom of the valve tube 102. Under such conditions there is suddenly created a large imbalance of forces on the piston and the upward forces developed within the outer annular chamber 156 literally snap the piston 98 back to its retracted position. As the piston 98 moves rapidly upward within the cylinder 96, it tends to compress the air within the cylinder which acts as a buffer to retard the rate of travel of the piston and to prevent the piston from striking the bottom of the cap 110 with a sufficient force to cause damage to the piston assembly. In this retracted position for the piston 98, the end of valve tube 102 remains extended beyond the end of the piston until manually returned to its original position, for example, during reloading of the bomb ejector.

From the foregoing, it is appreciated that the present invention provides an ejector mechanism which is capable of acting upon a varying pressure fluid charge to produce a substantially uniform force on a drive piston over a predetermined length of time, whereby bombs fired by the ejector mechanism possess a terminal velocity approximating the maximum theoretical value for a given maximum allowable reaction force. This, the present invention accomplishes with a simple design which may be fashioned as an adapter kit to modify existing bomb racks, is extremely reliable in operation, and which, due to its self-cleaning nature, requires little if any servicing over periods of extended use.

Moreover, in the ejector mechanism of the present invention, minimum fluid forces are developed on the tubing transporting the high pressure fluid from the gas generator to the drive piston assembly. thereby allowing the use of relatively lightweight and inexpensive tubing materials. In addition, since the ejector mechanism enables the drive piston to achieve a maximum terminal velocity for a given force, it is often possible to utilize less powerful cartridges and still reliably fire bombs with a sufficient velocity to clear the associated aircraft. Under such conditions, the forces developed on the breechblock are materially reduced allowing the use of lightweight metals for the breechblock at a substantial cost savings when compared with conventional ejectors which require the use of extremely high strength, heat resistant and expensive materials such as titanium.

Although the present invention has been described with respect to a bomb rack, it is appreciated that the ejector mechanism is equally useful in other fluid drive mechanisms, such as catapults, seat ejectors and rocket firing assemblies and may be utilized to drive various members and devices other than pistons. In fact, the piston may be replaced by any drive member which is movable in response to fluid pressure applied thereto and which in moving controls the size of the fluid orifice leading to the drive member.

In addition, the variable area orifice nede not be formed by a tapered stationary tube and movable shoulder. The stationary tube could be of constant dimension and the movable member of varying dimension to define an orifice which varies in area as the member moves. Also, the stationary and movable members need not be tubular and depending upon the surrounding structure, either or both may be solid members defining an orifice of variable area therebetween. In fact, both members may be movable with respect to each other.

Furthermore, although in the described ejector mechanism a uniform force is produced over a predetermined period of time, by suitable control of the dimensions of the stationary and movable members defining the variable area orifice, it is possible for the ejector mechanism to develop a drive force which is any predetermined function of the movement of the movable member. Thus, for example, by suitable dimensioning of the stationary tube 110 relative to the shoulder 134, the piston 98 can be made to slow down, travel at a uniform velocity and speed up along its stroke as desired for the particular device utilizing the ejector mechanism.

In view of the foregoing, it will be evident that changes and modifications may be made in the illustrated form without departing from the spirit of the present invention.

I claim:
1. A bomb ejector mechanism for aircraft, comprising:
   a varying pressure, fluid charge having a predetermined pressure versus time characteristic;
   a generally vertical cylinder having a closed upper end and an open lower end;
   a hollow piston movable in said cylinder between retracted and extended positions, said piston having a vertical hole in a top and an aligned vertical hole in a bottom, said top being opposite said upper end of said cylinder to define a fluid receiving chamber and said bottom being adapted to travel through said open lower end of said cylinder with downward movement of said piston toward said extended position;
   a stationary tube extending vertically from said upper end of said cylinder through said hole in said top of said piston for receiving and passing fluid of said charge into said piston and hence to said chamber, said tube having a varying outside diameter to define an orifice therearound of varying area with movement of said piston along said cylinder toward said extended position, said outside diameter varying inversely along its length with changes in the fluid pressure from said charge to maintain a constant pressure in said chamber;
   and a vertical valve tube having an open upper end receiving said stationary tube, a closed lower end extending through said hole in said bottom of said piston, and a side port adjacent said closed lower end of said valve tube normally blocked by said piston, said valve tube being movable with said piston and movable relative thereto between a retracted position with said side port blocked by said piston and an extended position with said closed lower end beyond said bottom of said piston to expose said side port.

2. The bomb ejector of claim 1, wherein:
   said valve tube includes a second side port open to the hollow in said piston when said valve tube is in said retracted position and blocked by said piston when said valve tube is in said extended position;
   said piston includes an outer shoulder adjacent said top and in sliding contact with the inner surface of said cylinder;
   said cylinder includes a portion of enlarged cross-sectional area defining a variable volume outer chamber with said shoulder around said piston;
   and said piston includes a side port to said outer chamber whereby said outer chamber defines an accumulator for receiving a portion of the fluid of said charge to develop an upward pressure force on said shoulder in opposition to the downward force on said top of said piston to automatically return said piston to said retracted position in said cylinder after movement of said piston and said valve tube to said extended positions.

3. A fluid pressure controlled ejector mechanism, comprising:
   a cylinder including a closed cylinder head and an open opposite end;
   a hollow piston movable in said cylinder between retracted and extended positions, said piston having a first end with a hole therethrough opposite said cylinder head to define a fluid-receiving chamber, and a closed second end with a hole therethrough adapted to travel through said open end of said cylinder with outward movement of said piston toward said extended position;
   a variable area orifice for receiving fluid from a fluid pressure supply and passing same to said chamber to develop fluid pressure on said first end of said piston to drive said piston toward said extended position, said orifice including a stationary tube of varying outside diameter extending from said cylinder head through said hole in said first end of said piston into the hollow thereof for receiving fluid from said fluid supply; and a tubular valve tube movable with said piston and having an open end for receiving said stationary tube defining an orifice therebetween, said orifice being of varying area as said piston travels along said cylinder, said valve tube having a closed end extending through said hole in said second end of said piston, and a side port adjacent said closed end normally being blocked by said piston and being movable relative to said piston between a first position with said side port blocked by said piston and a second position with said closed end beyond said second end of said piston to expose side port.

4. The ejector mechanism of claim 3, wherein said valve tube includes a second side port open to said hollow in said first position and blocked by said piston in said second position.

5. The ejector mechanism of claim 4, wherein:
said piston includes an outer shoulder adjacent said first end and in sliding contact with the inner wall of said cylinder;
said cylinder includes a portion of enlarged cross-sectional area defining a variable volume outer chamber with said shoulder around said piston; and
said piston includes a side port to said outer chamber whereby said outer chamber defines an accumulator for receiving a portion of the fluid of said supply to develop a pressure force on said first end of said piston to automatically return said piston into said retracted position in said cylinder after movement of said piston to said extended position and said valve tube to said second position.

6. A pressure-controlled drive mechanism, comprising:
a varying pressure fluid supply;
a variable-volume, fluid receiving chamber;
drive means movable in response to the introduction of pressurized fluid from said supply into said chamber to vary the volume of said chamber;
an orifice means for receiving fluid from said supply and passing same to said chamber to develop a fluid pressure on said drive means, said orifice means including means for varying the orifice area inversely with changes in the pressure of fluid from said supply, whereby a substantially constant pressure is developed in said chamber to exert a substantially constant force on said drive means;
and valve means for venting said fluid receiving chamber, said valve means being normally closed and opened only when said drive means is in the fully extended position.

7. The drive mechanism of claim 6, wherein said area-varying means is operable over a substantial portion of the movement of said drive means.

8. The drive mechanism of claim 6, wherein said area-varying means includes an elongated first member of varying surface dimension and a second member arranged for relative movement along said surface over a distance comprising a substantial portion of the movement of said drive means, one of said members being movable with said drive member to produce such relative movement of said members and thereby vary the area of said orifices.

9. The drive mechanism of claim 8, wherein said surface dimension varies in accordance with pressure variations of said supply.

10. A fluid pressure controlled ejector mechanism, comprising:
a varying pressure fluid supply having a predetermined pressure versus time characteristic;
a cylinder including a closed cylinder head and an open opposite end;
a piston movable in said cylinder between retracted and extended positions, said piston having a first end opposite said cylinder head to define a fluid receiving chamber and a second end adapted to travel through said open end of said cylinder with outward movement of said piston toward said extended position;
and variable area orifice means for receiving fluid from said fluid supply and passing same to said chamber to develop fluid pressure on said first end of said orifice means including valve means movable with said piston to vary the area of said orifice means in accordance with the pressure versus time characteristic of said fluid supply and movement of said piston to provide a substantially constant pressure and force on said piston during movement of said piston;
and an accumulator for receiving a portion of the fluid from said supply for developing a second fluid pressure in response thereto, and for applying said second pressure to said piston against said first mentioned fluid pressure to automatically return said piston to said retracted position in said cylinder only after outward movement of said piston to said extended position.

11. The ejector mechanism of claim 10, wherein:
said piston is a hollow piston having a hole in said first end and a closed second end;
said orifice means includes a stationary tube of varying outside diameter extending from said cylinder head through said hole in said first end of said piston into the hollow thereof for receiving fluid from said fluid pressure supply;
and said valve means is tubular and receives said stationary tube to define said orifice therebetween, said orifice being of varying area as said piston travels along said cylinder.

12. A drive mechanism having, in combination:
means for generating a charge of fluid under momentarily high pressure that decreases progressively over a predetermined period of time;
first and second relatively movable drive members fitted together and defining between them an expansible, substantially sealed fluid chamber, said second member being movable relative to said first member from a normal, retracted position to an extended position and having an end wall forming a wall of said chamber whereby the introduction of fluid under pressure to said chamber expands the latter and produces such movement of said second member to produce an output force depending upon the rate of delivery of fluid to said chamber;
and means for delivering fluid from said generating means to said chamber and maintaining said output force substantially constant during said period, including
spaced and opposed surfaces on said members defining an inlet orifice opening into said chamber and having a preselected restricted flow area when said second member is in said retracted position,
said surfaces remaining in opposed relation during movement of said second member toward said extended position but becoming spaced apart a progressively increasing distance to progressively increase the area of said orifice and thereby compensate for the progressive decrease in said pressure during said predetermined period of time.

13. A drive mechanism as defined in claim 12 in which said opposed surfaces are formed by inner and outer telescoped elements on said drive members, said inner element being elongated and tapered in the direction of movement of said second member toward said extended position and said outer element being the surface of an opening movable along said tapered element during such movement of said second member.

14. A drive mechanism as defined in claim 13 in which said tapered element is fixed on said first member and said opening is formed in said end wall of said second member with said tapered element extending through said opening.

15. A drive mechanism as defined in claim 14 in which said tapered element is a tube through the center of which said fluid is admitted into said second member to flow around the latter to said orifice and into said chamber.

16. A drive mechanism for developing a controlled output force during a predetermined period of time in response to the delivery to the mechanism of actuating fluid under pressure that varies in a known manner during said period, said mechanism comprising:

first and second relatively movable drive members fitted together and defining between them an expansible, substantially sealed fluid chamber, said second member being movable relative to said first member from a normal, retracted position to an extended position and having an end wall forming a wall of said chamber whereby the introduction of fluid under pressure to said chamber expands the latter in accordance with the rate of introduction of fluid thereby produces such movement to produce the output force;

and means for controlling the output force produced by said pressure in accordance with the relative positions of said members by controlling the admission of fluid into said chamber, said controlling means including an inlet orifice defined between spaced and opposed surfaces on the respective members and spaced apart, when said second member is in said retracted position, a preselected distance to form said orifice with a selected initial area correlated with the known initial value of said fluid pressure to produce a selected initial output force, said surfaces remaining in spaced and opposed relation as said second member moves toward said extended position but varying the spacing, and thus the area of said orifice, during such movement according to the known variations in said pressure thereby to control the output throughout said period.

17. A drive mechanism as defined in claim 16 in which said surfaces are shaped to increase the area of said orifice progressively as in incident to movement of said second member from said retracted position to said extended position, thereby to compensate for a progressive decrease in the pressure of said actuating fluid during said period and maintain the output force substantially constant during said period.

18. A drive mechanism as defined in claim 17 in which said first and second members are outer and inner telescoped tubes, respectively, having spaced end walls defining said chamber, said surfaces being formed by an opening in the end wall of said inner tube and by the outside of an element fast on said outer tube and extending through and beyond said opening, said element being tapered in the direction of movement of said inner tube to progressively increase the clearance between said surfaces during such movement.

References Cited

UNITED STATES PATENTS

| | | | |
|---|---|---|---|
| 244,092 | 7/1881 | Thayer | 91—396 |
| 2,293,167 | 8/1942 | Overbeke | 92—113 |
| 2,703,558 | 3/1955 | Wilcox | 91—416 |
| 2,931,218 | 4/1960 | Ottestad | 91—396 |
| 3,031,845 | 5/1962 | Ludwig | 60—26.1 |

FOREIGN PATENTS

| | | | |
|---|---|---|---|
| 23,904 | 1/1892 | Great Britain | 91—395 |

PAUL E. MASLOUSKY, Primary Examiner

U.S. Cl. X.R.

91—394, 416; 92—110, 113